United States Patent
Torgerson et al.

(10) Patent No.: US 10,499,610 B2
(45) Date of Patent: *Dec. 10, 2019

(54) MILK TUBE DOME WITH FLOW CONTROLLER

(71) Applicant: GEA Farm Technologies, Inc., Naperville, IL (US)

(72) Inventors: Kevin L. Torgerson, Holmen, WI (US); Duane F. Sellner, Comfrey, MN (US)

(73) Assignee: GEA Farm Technologies, Inc., Naperville, IL (US)

( * ) Notice: Subject to any disclaimer, the term of this patent is extended or adjusted under 35 U.S.C. 154(b) by 62 days.

This patent is subject to a terminal disclaimer.

(21) Appl. No.: 15/705,340

(22) Filed: Sep. 15, 2017

(65) Prior Publication Data

US 2018/0064056 A1 Mar. 8, 2018

Related U.S. Application Data

(63) Continuation of application No. 15/087,319, filed on Mar. 31, 2016, now Pat. No. 9,770,006, which is a continuation of application No. 14/627,240, filed on Feb. 20, 2015, now Pat. No. 9,545,079, which is a continuation of application No. 13/350,528, filed on Jan. 13, 2012, now Pat. No. 8,991,335, which is a continuation of application No. 12/215,706, filed on Jun. 27, 2008, now Pat. No. 8,117,989.

(51) Int. Cl.
*A01J 5/06* (2006.01)
*A01J 7/04* (2006.01)

(52) U.S. Cl.
CPC .. *A01J 5/06* (2013.01); *A01J 7/04* (2013.01)

(58) Field of Classification Search
CPC .................................. A01J 5/06; A01J 7/04
See application file for complete search history.

(56) References Cited

U.S. PATENT DOCUMENTS

| | | | |
|---|---|---|---|
| 1,365,665 | A | 1/1921 | Davies |
| 2,012,031 | A | 8/1935 | Woodruff |
| 2,532,088 | A | 11/1950 | Cordis |
| 2,747,544 | A | 5/1956 | Thomas |
| 3,014,455 | A | 12/1961 | Olander |

(Continued)

FOREIGN PATENT DOCUMENTS

| | | |
|---|---|---|
| AU | 641229 | 9/1993 |
| AU | 2013294747 B2 | 11/2016 |

(Continued)

OTHER PUBLICATIONS

"Grade A pasteurized milk ordinance" 2003 Revision; US Department Health and Human Services, Public Health Service; Food and Drug Administration.

(Continued)

*Primary Examiner* — Joshua D Huson
(74) *Attorney, Agent, or Firm* — Smith Law Office; Jeffry W. Smith

(57) ABSTRACT

A milker unit liner dome having an inner surface and flow diverters joined to the inner surface to redirect teat dip from an inlet to provide more uniform coverage of dip on a teat. The liner dome can also include more than one flow diverter for redirecting teat dip flow.

10 Claims, 5 Drawing Sheets

(56) References Cited

U.S. PATENT DOCUMENTS

| | | |
|---|---|---|
| 3,099,246 A | 7/1963 | Beskow |
| 3,119,401 A | 1/1964 | Merritt et al. |
| 3,417,763 A | 12/1968 | Fjermestad et al. |
| 3,461,845 A | 8/1969 | Peterson |
| 3,474,760 A | 10/1969 | Siddall et al. |
| 3,482,547 A | 12/1969 | Maier |
| 3,500,839 A | 3/1970 | Bender |
| 3,630,081 A | 12/1971 | Nelson |
| 3,648,696 A | 3/1972 | Keith |
| 3,688,783 A | 9/1972 | Owens |
| 3,696,790 A | 10/1972 | Albright |
| 3,713,423 A | 1/1973 | Sparr, Sr. |
| 3,726,253 A | 4/1973 | Duncan |
| 3,762,371 A | 10/1973 | Quayle et al. |
| 3,789,798 A | 2/1974 | Reisgies et al. |
| 3,797,525 A | 3/1974 | Lieser |
| 3,861,335 A | 1/1975 | Przewalski |
| 3,861,355 A | 1/1975 | Johnson et al. |
| 3,957,018 A | 5/1976 | Barrett |
| 3,971,512 A | 7/1976 | Duncan |
| 3,973,520 A | 8/1976 | Flocchini |
| 4,034,714 A | 7/1977 | Umbaugh et al. |
| 4,061,504 A | 12/1977 | Zall et al. |
| 4,149,489 A | 4/1979 | Umbaugh et al. |
| 4,168,677 A | 9/1979 | Brown |
| 4,175,514 A | 11/1979 | Souza et al. |
| 4,177,760 A | 12/1979 | Slater |
| 4,222,346 A | 9/1980 | Reisgies |
| 4,253,421 A | 3/1981 | Slater et al. |
| 4,295,490 A | 10/1981 | Boudreau |
| 4,305,346 A | 12/1981 | Sparr, Sr. |
| 4,332,215 A | 6/1982 | Larson |
| 4,333,387 A | 6/1982 | Seitz |
| 4,333,421 A | 6/1982 | Schluckbier |
| 4,344,385 A | 8/1982 | Swanson et al. |
| 4,372,345 A | 2/1983 | Menus |
| 4,378,757 A | 4/1983 | Hamann |
| 4,393,811 A | 7/1983 | Bodmin |
| 4,395,971 A | 8/1983 | Happel et al. |
| 4,403,568 A | 9/1983 | Fukuhara et al. |
| 4,403,569 A | 9/1983 | Bennett |
| 4,459,938 A | 7/1984 | Noorlander |
| 4,462,425 A | 7/1984 | Mehus |
| 4,485,762 A | 12/1984 | Sutton et al. |
| 4,498,419 A | 2/1985 | Flocchini |
| 4,516,530 A | 5/1985 | Reisgies et al. |
| 4,572,105 A | 2/1986 | Chowdhury et al. |
| 4,586,462 A | 5/1986 | Icking |
| 4,593,649 A | 6/1986 | Britten |
| 4,903,639 A | 2/1990 | Kessel |
| 4,907,535 A | 3/1990 | Matsuzawa et al. |
| 4,924,809 A | 5/1990 | Verbrugge |
| 4,936,254 A | 6/1990 | Marshall |
| 5,052,341 A | 10/1991 | Woolford et al. |
| 5,101,770 A | 4/1992 | Stevenson |
| 5,134,967 A | 8/1992 | Marshall |
| 5,161,482 A | 11/1992 | Griffin |
| 5,166,313 A | 11/1992 | Archibald et al. |
| 5,167,201 A | 12/1992 | Peles |
| 5,178,095 A | 1/1993 | Mein |
| 5,218,924 A | 6/1993 | Thompson et al. |
| 5,255,628 A | 10/1993 | Kristoffer |
| 5,379,722 A | 1/1995 | Larson |
| 5,386,799 A | 2/1995 | Dietrich |
| 5,390,627 A | 2/1995 | Van Der Berg et al. |
| 5,403,005 A | 4/1995 | Avila-Valdez |
| 5,493,995 A | 2/1996 | Chowdhury |
| 5,568,788 A | 10/1996 | Van Den Berg |
| 5,572,947 A | 11/1996 | Larson et al. |
| 5,673,650 A | 10/1997 | Mottram et al. |
| 5,697,325 A | 12/1997 | Gehm et al. |
| 5,722,343 A | 3/1998 | Aurik et al. |
| 5,769,025 A | 6/1998 | Van Der Lely et al. |
| 5,778,820 A | 7/1998 | Van Der Lely et al. |
| 5,850,845 A | 12/1998 | Pareira et al. |
| 5,881,669 A | 3/1999 | Van Den Berg et al. |
| 5,896,828 A | 4/1999 | Kronschnabel et al. |
| 5,909,716 A | 6/1999 | Van Der Lely |
| 5,934,220 A | 8/1999 | Hall et al. |
| 5,957,081 A | 9/1999 | Van Der Lely et al. |
| 5,960,736 A | 10/1999 | Ludington et al. |
| 5,992,347 A | 11/1999 | Innings et al. |
| 6,009,833 A | 1/2000 | Van Der Lely |
| 6,079,359 A | 6/2000 | Van Den Berg |
| 6,089,242 A | 7/2000 | Buck |
| 6,098,570 A | 8/2000 | Aurik et al. |
| 6,202,593 B1 | 3/2001 | Maier et al. |
| 6,234,110 B1 | 5/2001 | Xavier |
| 6,244,215 B1 | 6/2001 | Oosterling |
| 6,267,077 B1 | 7/2001 | Van Den Berg et al. |
| 6,276,297 B1 | 8/2001 | Van Den Berg et al. |
| 6,308,655 B1 | 10/2001 | Oosterling |
| 6,318,299 B1 | 11/2001 | Birk |
| 6,321,682 B1 | 11/2001 | Eriksson et al. |
| 6,367,416 B1 | 4/2002 | Van Der Lely |
| 6,371,046 B1 | 4/2002 | Petterson et al. |
| 6,435,132 B1 | 8/2002 | Milbrath et al. |
| 6,546,893 B1 | 4/2003 | Happel et al. |
| 6,550,420 B1 | 4/2003 | Bjork |
| 6,561,126 B2 | 5/2003 | Forsen et al. |
| 6,584,930 B2 | 7/2003 | Buecker |
| 6,591,784 B1 | 7/2003 | Eriksson |
| 6,598,560 B1 | 7/2003 | Van Den Berg |
| 6,619,227 B1 | 9/2003 | Berger et al. |
| 6,626,130 B1 | 9/2003 | Eriksson |
| 6,644,240 B1 | 11/2003 | Dietrich |
| 6,752,102 B2 | 6/2004 | Dahl et al. |
| 6,755,153 B1 | 6/2004 | Chowdhury |
| 6,935,270 B2 | 8/2005 | Wipperfurth et al. |
| 6,997,136 B1 | 2/2006 | Coates |
| 7,036,981 B2 | 5/2006 | Veenstra et al. |
| 7,128,020 B2 | 10/2006 | Björk et al. |
| 7,143,718 B2 | 12/2006 | Bosma et al. |
| 7,162,970 B2 | 1/2007 | Maier, Jr. |
| 7,174,848 B2 | 2/2007 | Brown et al. |
| 7,178,480 B2 | 2/2007 | Dahl et al. |
| 7,237,694 B2 | 7/2007 | Freudinger |
| 7,263,948 B2 | 9/2007 | Ericsson et al. |
| 7,281,493 B2 | 10/2007 | Dietrich |
| 7,290,497 B2 | 11/2007 | Rottier et al. |
| 7,350,478 B2 | 4/2008 | Fernandez |
| 7,377,232 B2 | 5/2008 | Holmgren et al. |
| 7,401,573 B2 | 7/2008 | Torgerson |
| 7,412,943 B2 | 8/2008 | Ericsson et al. |
| 7,484,474 B2 | 2/2009 | Van Den Berg et al. |
| 7,536,975 B2 | 5/2009 | Denes et al. |
| 7,575,022 B2 | 8/2009 | Higgins |
| 7,578,260 B2 | 8/2009 | Shin |
| 7,707,966 B2 | 5/2010 | Torgerson et al. |
| 7,765,951 B2 | 8/2010 | Dietrich |
| 7,793,614 B2 | 9/2010 | Ericsson et al. |
| 7,926,449 B2 | 4/2011 | Stellnert et al. |
| 7,963,249 B2 | 6/2011 | Duke |
| 8,025,029 B2 | 9/2011 | Torgerson et al. |
| 8,033,247 B2 | 10/2011 | Torgerson et al. |
| 8,117,989 B2 * | 2/2012 | Torgerson ............... A01J 5/06 119/14.47 |
| 8,210,123 B2 | 7/2012 | Duke |
| 8,240,272 B2 | 8/2012 | Duke |
| 8,342,125 B2 | 1/2013 | Torgerson et al. |
| 8,590,486 B2 | 11/2013 | Torgerson et al. |
| 8,677,937 B2 | 3/2014 | Shin |
| 8,770,146 B2 | 7/2014 | Buck et al. |
| 8,925,483 B2 | 1/2015 | Torgerson et al. |
| 8,991,335 B2 * | 3/2015 | Torgerson ............... A01J 5/06 119/14.47 |
| 9,016,238 B2 | 4/2015 | Duke |
| 9,049,835 B2 | 6/2015 | Duke |
| 9,468,190 B2 | 10/2016 | Duke |
| 9,545,079 B2 * | 1/2017 | Torgerson ............... A01J 5/06 |
| 9,686,958 B2 | 6/2017 | Sellner et al. |
| 9,770,006 B2 * | 9/2017 | Torgerson ............... A01J 5/06 |
| 2002/0185071 A1 | 12/2002 | Guo |
| 2003/0226520 A1 | 12/2003 | Dietrich |

(56) References Cited

U.S. PATENT DOCUMENTS

| | | |
|---|---|---|
| 2004/0089242 A1 | 5/2004 | Verstege et al. |
| 2004/0231603 A1* | 11/2004 | Bjork ............... A01J 7/04 119/14.18 |
| 2005/0274327 A1 | 12/2005 | Johnsson et al. |
| 2006/0016399 A1 | 1/2006 | Torgerson |
| 2006/0037542 A1 | 2/2006 | Denes et al. |
| 2006/0049212 A1 | 3/2006 | Freudinger |
| 2006/0112887 A1 | 6/2006 | Brown et al. |
| 2007/0070803 A1 | 3/2007 | Urquhart |
| 2007/0157887 A1 | 7/2007 | Fernandez |
| 2007/0186860 A1 | 8/2007 | Dietrich |
| 2007/0215053 A1 | 9/2007 | Duke |
| 2007/0277737 A1 | 12/2007 | Maier et al. |
| 2008/0022932 A1 | 1/2008 | Rottier et al. |
| 2008/0202433 A1 | 8/2008 | Duke |
| 2008/0276871 A1 | 11/2008 | Auburger et al. |
| 2008/0314322 A1 | 12/2008 | Stellnert et al. |
| 2009/0050061 A1 | 2/2009 | Duke |
| 2009/0050062 A1 | 2/2009 | Auburger et al. |
| 2009/0064937 A1 | 3/2009 | Rottier et al. |
| 2009/0151641 A1 | 6/2009 | Schulze Wartenhorst et al. |
| 2009/0165724 A1 | 7/2009 | Mader et al. |
| 2009/0320760 A1 | 12/2009 | Torgerson et al. |
| 2010/0132626 A1 | 6/2010 | Torgerson et al. |
| 2010/0154900 A1 | 6/2010 | Torgerson et al. |
| 2010/0236487 A1 | 9/2010 | Stellnert et al. |
| 2010/0326360 A1 | 12/2010 | Duke et al. |
| 2011/0220028 A1 | 9/2011 | Duke |
| 2011/0220160 A1 | 9/2011 | Bosma |
| 2011/0232575 A1 | 9/2011 | Duke |
| 2012/0017836 A1 | 1/2012 | Torgerson et al. |
| 2012/0111275 A1 | 5/2012 | Torgerson et al. |
| 2012/0118237 A1 | 5/2012 | Torgerson et al. |
| 2012/0118238 A1 | 5/2012 | Torgerson et al. |
| 2012/0272911 A1 | 11/2012 | Duke |
| 2013/0199449 A1 | 8/2013 | Daniel |
| 2014/0283751 A1 | 9/2014 | Buck et al. |
| 2015/0201577 A1 | 7/2015 | Duke |
| 2015/0260302 A1 | 9/2015 | Peterson et al. |
| 2016/0319947 A1 | 11/2016 | Balkenhol |
| 2017/0014837 A1 | 1/2017 | Duke |
| 2017/0164576 A1 | 6/2017 | Balkenhol et al. |
| 2017/0359995 A1 | 12/2017 | Sellner et al. |
| 2018/0220616 A1 | 8/2018 | Torgerson et al. |
| 2018/0235173 A1 | 8/2018 | Torgerson et al. |
| 2019/0133067 A1 | 5/2019 | Stuessel et al. |
| 2019/0133069 A1 | 5/2019 | Stuessel et al. |

FOREIGN PATENT DOCUMENTS

| | | |
|---|---|---|
| AU | 2015227478 B2 | 6/2018 |
| DE | 1801758 | 6/1970 |
| DE | 1582939 | 7/1970 |
| DE | 2622794 | 12/1977 |
| DE | 3540058 | 5/1987 |
| DE | 261300 | 10/1988 |
| DE | 4006785 | 9/1990 |
| DE | 10160161 A1 | 6/2003 |
| EP | 0277396 A1 | 8/1988 |
| EP | 0313109 A2 | 4/1989 |
| EP | 0319523 A2 | 6/1989 |
| EP | 0332235 A2 | 9/1989 |
| EP | 0459817 A1 | 12/1991 |
| EP | 0479397 A2 | 4/1992 |
| EP | 0527509 A2 | 2/1993 |
| EP | 0543463 A1 | 5/1993 |
| EP | 0630557 A2 | 12/1994 |
| EP | 0728412 A2 | 8/1996 |
| EP | 0801893 A2 | 10/1997 |
| EP | 0945057 A1 | 9/1999 |
| EP | 1219167 A2 | 7/2002 |
| EP | 1222853 A2 | 7/2002 |
| EP | 1089615 B1 | 3/2003 |
| EP | 1520469 A1 | 4/2005 |
| EP | 1543720 A1 | 6/2005 |
| EP | 1790217 A2 | 5/2007 |
| EP | 1795069 A1 | 6/2007 |
| EP | 1679956 B1 | 12/2008 |
| EP | 2113169 A1 | 11/2009 |
| EP | 1933616 B1 | 1/2011 |
| EP | 2277373 A2 | 1/2011 |
| EP | 1737291 B1 | 11/2013 |
| GB | 918766 | 2/1963 |
| GB | 1160900 | 8/1969 |
| GB | 1440901 | 6/1976 |
| GB | 0324647.7 | 10/2003 |
| GB | 0402119.2 | 1/2004 |
| GB | 0408968.6 | 4/2004 |
| GB | 0417392.8 | 4/2004 |
| JP | 2002345955 | 12/2002 |
| JP | 2002354958 | 12/2002 |
| JP | 2005192404 | 7/2005 |
| NL | 1016237 | 3/2002 |
| NL | 1021950 C | 5/2004 |
| SU | 1676538 | 9/1991 |
| WO | 1993/13651 | 7/1993 |
| WO | 1998/28969 | 7/1998 |
| WO | 1999/27775 | 6/1999 |
| WO | 1999/46978 | 9/1999 |
| WO | 1999/66767 | 12/1999 |
| WO | 1999/66787 | 12/1999 |
| WO | 01/07338 | 3/2001 |
| WO | 01/17337 | 3/2001 |
| WO | 02/07506 | 1/2002 |
| WO | 02/23976 | 3/2002 |
| WO | 03/030630 | 4/2003 |
| WO | 03/077645 | 9/2003 |
| WO | 03/098998 | 12/2003 |
| WO | 04/032608 | 4/2004 |
| WO | 2004/030445 A2 | 4/2004 |
| WO | 05/022986 | 3/2005 |
| WO | 05/043986 | 5/2005 |
| WO | 05/072516 | 8/2005 |
| WO | 05/102035 | 11/2005 |
| WO | 2006/029797 | 3/2006 |
| WO | 2006/110079 A1 | 10/2006 |
| WO | 2006/117019 | 11/2006 |
| WO | 2006/135917 | 12/2006 |
| WO | 2007/31783 | 3/2007 |
| WO | 2007/129884 | 11/2007 |
| WO | 2007/129888 | 11/2007 |
| WO | 2008/102567 | 8/2008 |
| WO | 2008/138862 | 11/2008 |
| WO | 2009/077607 | 6/2009 |
| WO | 2009/158000 | 12/2009 |
| WO | 2010/053577 | 5/2010 |
| WO | 2011/28292 | 3/2011 |
| WO | 2011/28293 | 3/2011 |
| WO | 2011/28294 | 3/2011 |
| WO | 2011102911 | 8/2011 |
| WO | 2014/016588 A1 | 1/2014 |
| WO | 2015/118336 A1 | 2/2015 |
| WO | 2015/145116 A1 | 10/2015 |
| WO | 2015/150807 A1 | 10/2015 |
| WO | 2019/090044 A1 | 5/2019 |
| WO | 2019/090136 A9 | 5/2019 |

OTHER PUBLICATIONS

"-A® Accepted Practices for Permanently Installed Product and Solution Pipelines and Cleaning Systems Used in Milk and Milk Product Processing Plants, No. 605-04," Section N; Aug. 20, 1994.

Akam, D.N., "The Development of Equipment for the Mechanization of Manual Operations in Milking Machine," 17th Annual Meeting, National Mastitis Counsel, Inc., Feb. 21-23, 1978, pp. 417-426.

Grindal; et al., "Automatic application of teat disinfectant through the milking machine cluster" Journal of Dairy Research, 56:579-585 (1989).

International Search Report and Written Opinion from PCT/US2011/00322, dated Dec. 20, 2011.

(56) References Cited

OTHER PUBLICATIONS

Letter to Alex Ferguson from Jeffry W. Smith dated Dec. 22, 2006, 2pp.
Neijenhuis; et al., "Health of dairy cows milked by an automatic milking system; Effects of milking interval on teat condition and milking performance with whole-udder take off", Oct. 2003, 23 pages.
Office Action for U.S. Appl. No. 10/576,744 dated Jun. 3, 2010, 8pp.
Office Action for 11/652,372 dated Feb. 11, 2008, 14pp.
Office Action for 11/662,454 dated Aug. 16, 2010, 20 pp.
Office Action for 11/904,769 dated Feb. 20, 2008, 9pp.
Office Action for 12/712,787 dated Jun. 27, 2011.
PCT/GB04/004343—Written Opinion of ISA & IPRP rec'd dated Feb. 3, 2005, 5pp.
PCT/US06/023075—ISR & Written Opinion rec'd dated Oct. 16, 2006.
PCT/US09/006026—IPRP, Written Opinion of ISA & ISR rec'd dated Mar. 6, 2010, 9pp.
PCT/US09/03770—IPRP and Written Opinion rec'd dated Jan. 13, 2011, and ISR rec'd Oct. 7, 2009.
Preliminary Amendment for U.S. Appl. No. 10/576,744, filed Apr. 21, 2006, 16pp.
Preliminary Amendment for U.S. Appl. No. 10/576,744, filed Aug. 7, 2008, 10 pp.
Shearn; et al., "Reduction of bacterial contamination of teat cup liners by an entrained wash system," Veterinary Record (1994), 134, 450, 1p.
Thompson; et al. "The End-of-Milking Sequence and its Mechanization" 1976 Winter Mtg., Dec. 14-17, 1976, Animal Physiology and Genetics Inst., Beltsville, MD, 15pp.
U.S. Appl. No. 60/566,313, filed Apr. 29, 2004, J.R.J. Duke.
U.S. Appl. No. 60/566,314, filed Apr. 29, 2004, J.R.J. Duke.
U.S. Appl. No. 60/578,997, filed Jun. 12, 2004, Kevin L. Torgerson.
Notice of Opposition and Opposition brief for EP Patent 1737291, Filed on Aug. 26, 2014 by GEA Farm Technologies GmbH, 74 pages.
Response filed Feb. 2, 2015 by an Udder IP Company in the Opposition of EP Patent 1737291, 53 pages.
European Search Report dated Sep. 24, 2015 for EP Application No. 15171008.4, 6 pages.
Reply filed on Dec. 16, 2015 by GEA Farm Technologies GmbH in the Opposition of EP Patent No. 1737291, 75 pages.
Wildbrett et al., "Über Reinigung und Desinfektion von Tanks" Materials and Corrosion 12(12):759-764. Nov. 1961.
European Patent Office Preliminary Opinion and Summons to Attend Oral Proceedings dated Jan. 18, 2016, Opposition of EP Patent 1737291, 12 pages.
European Search Report dated Aug. 13, 2014, EP Application No. 14159588.4, 5 pages.
International Search Report and Written Opinion from PCT/EP2014/077684, dated Apr. 10, 2015, 10 pages.
Amendments and Observations filed Oct. 24, 2016 by an Udder IP Company Ltd in the Opposition of EP Patent 1737291, 47 pages.
Amendments and Observations filed Oct. 25, 2016 by GEA Farm Technologies GmbH in the Opposition of EP Patent 1737291, 13 pages.
Nov. 10, 2016 EPO Communication re: the Proprietor, An Udder IP Company Ltd's request concerning the staying/postponement of the opposition proceedings, Opposition of EP Patent 1737291, 1 page.
Nov. 25, 2016 EPO Communication re: results of the oral proceedings, Opposition of EP Patent 1737291, 5 pages.
Dec. 8, 2016 EPO Communication; Details and minutes of the oral proceedings, Opposition of EP Patent 1737291, 13 pages.
Jul. 27, 2017 EPO Communication; State of the Opposition Procedure and Summons to Attend Oral Proceedings, Opposition of EP Patent 1737291, 10 pages.
Response filed by an Udder IP Company LTD on Jun. 2, 2017, Opposition of EP Patent 1737291, 4 pages.
Response filed by GEA Farm Technologies GmbH on May 29, 2017, Opposition of EP Patent 1737291, 5 pages.
Mar. 30, 2017 EPO Communication, State of the Opposition Procedure and Invitation to File Observations, Opposition of EP Patent 1737291, 10 pages.
European Search Report dated Oct. 13, 2017, for European Appication No. 17171229.2, 6 pages.
International Search Report and Written Opinion from PCT/US2018/058897, dated Feb. 25, 2019, 19 pages.
International Search Report and Written Opinion from PCT/US2018/059041, dated Mar. 8, 2019, 20 pages.
Mar. 13, 2018 Letter from the Proprietor, An Udder IP Company Ltd, Regarding the Opposition Procedure for Opposition of EP Patent 1737291, 23 pages.
May 17, 2018 EPO Communication; Details and minutes of the oral proceedings, Opposition of EP Patent 1737291, 9 pages.
May 31, 2018 Interlocutory Decision in Opposition Proceedings, Opposition of EP Patent 1737291, 49 pages.
Sep. 27, 2018 Statement of Grounds for Appeal, Opposition of EP Patent 1737291, 29 pages.
Feb. 4, 2019 Reply to Grounds for Appeal, Opposition of EP Patent 1737291, 32 pages.

* cited by examiner

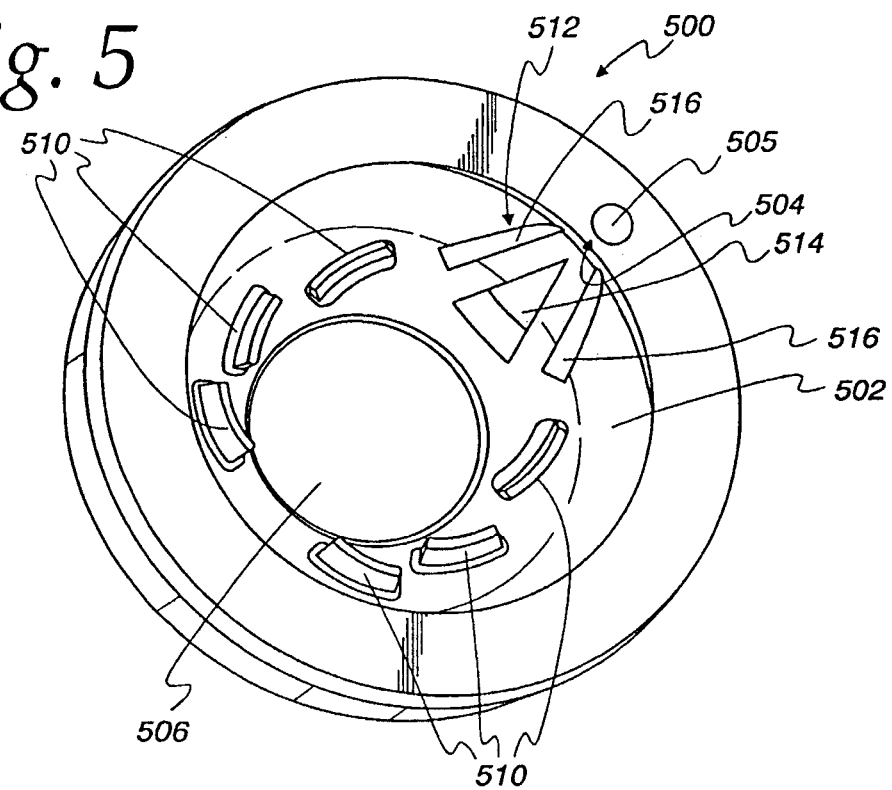
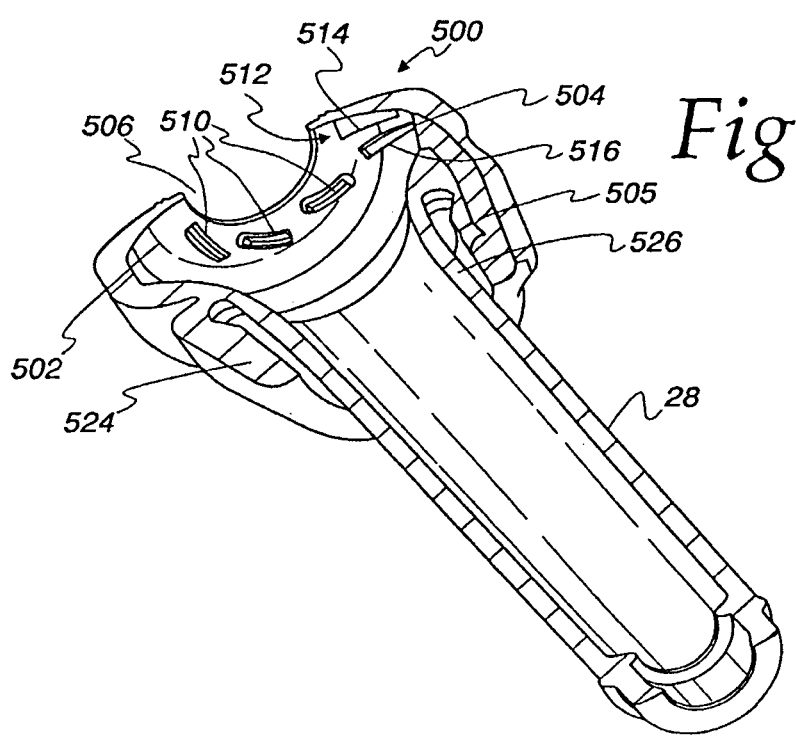

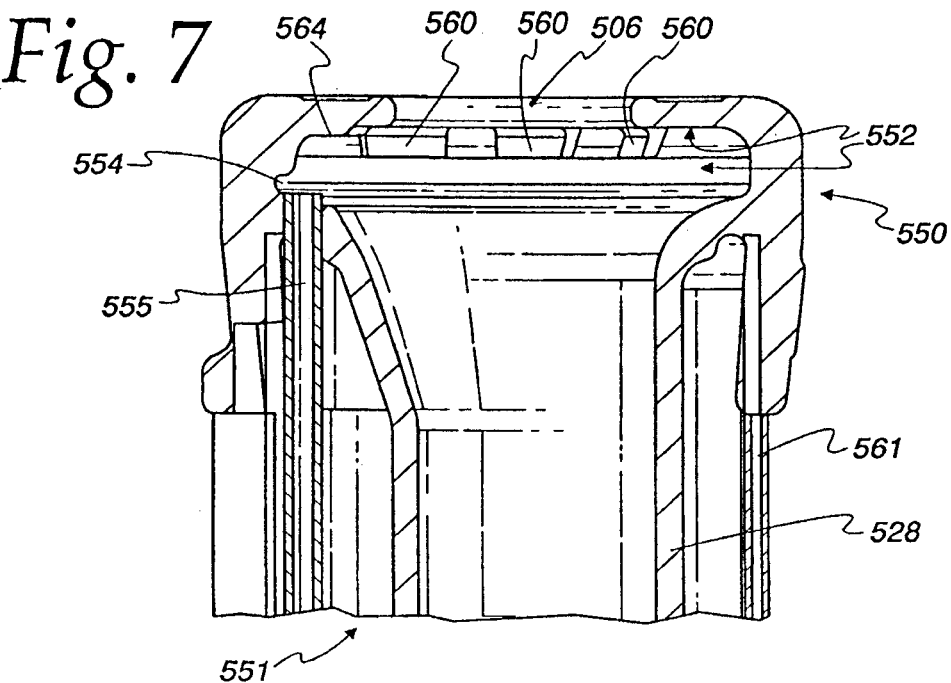
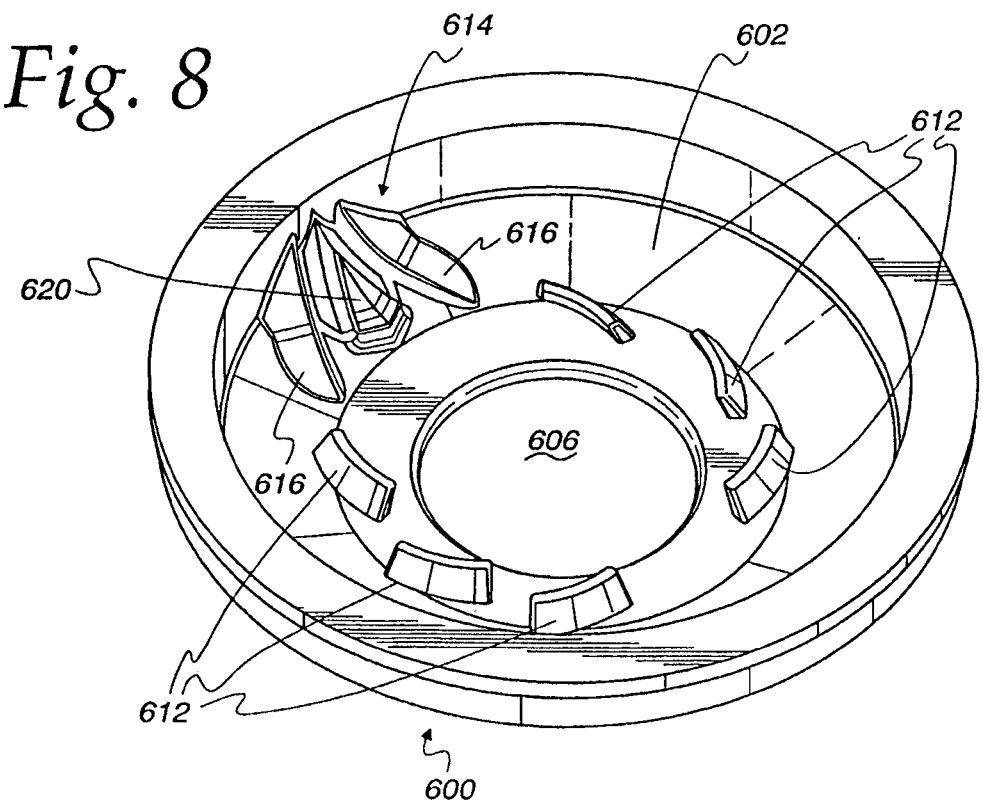

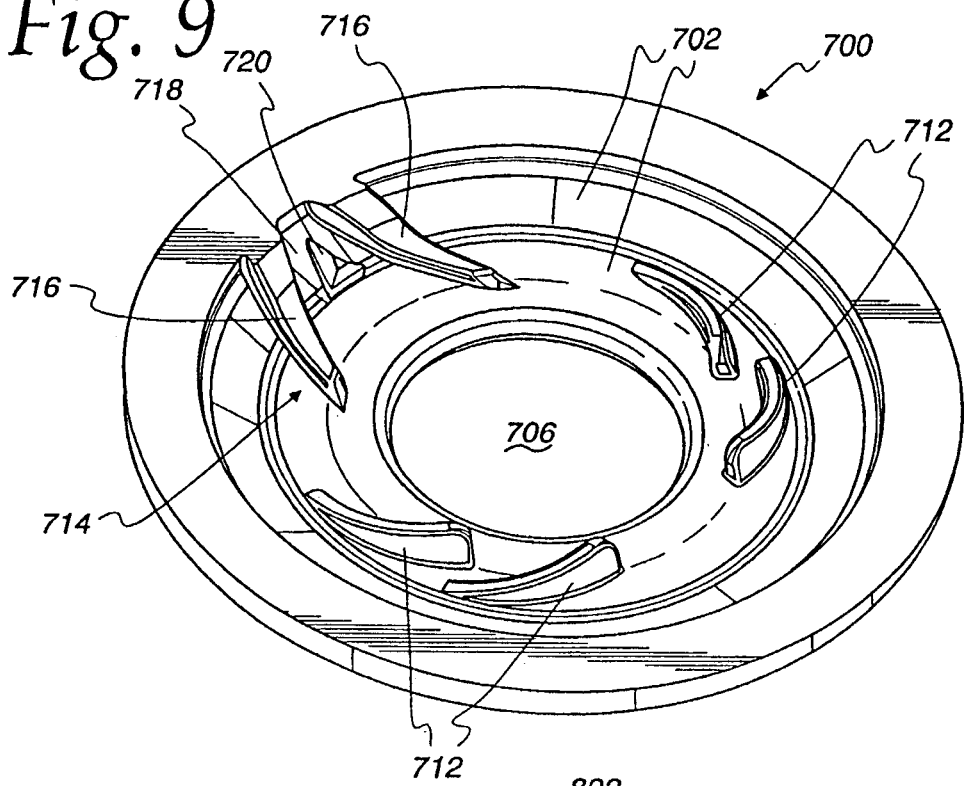
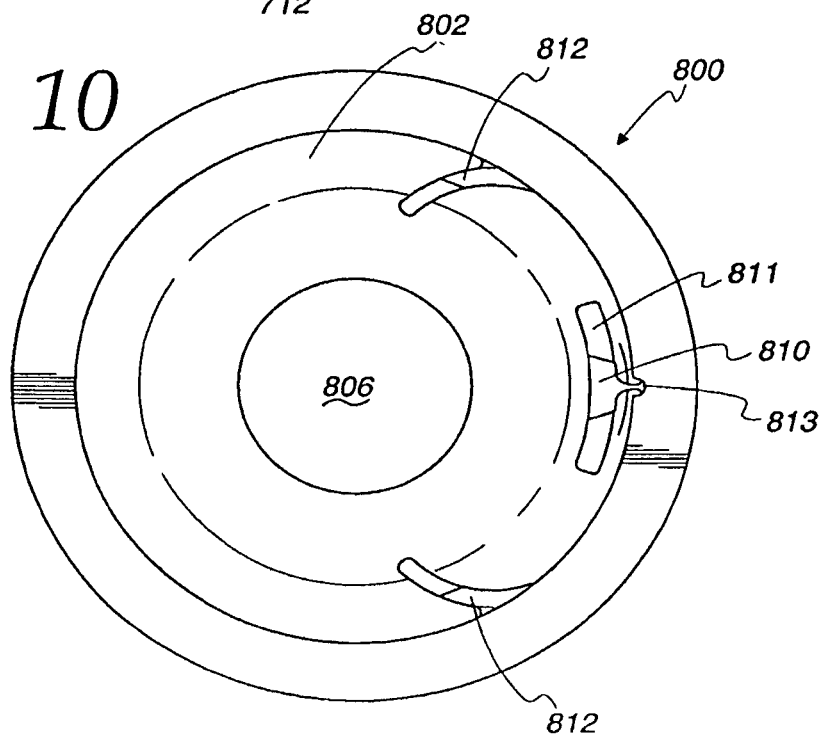

MILK TUBE DOME WITH FLOW CONTROLLER

This application is a continuation of U.S. patent application Ser. No. 15/087,319, filed Mar. 31, 2016, which is a continuation of U.S. patent application Ser. No. 14/627,240, filed Feb. 20, 2015, issued Jan. 17, 2017 under U.S. Pat. No. 9,545,079, which is a continuation of U.S. patent application Ser. No. 13/350,528, filed Jan. 13, 2012, issued Mar. 31, 2015 under U.S. Pat. No. 8,991,335, which is a continuation of U.S. patent application Ser. No. 12/215,706, filed Jun. 27, 2008, issued on Feb. 21, 2012 under U.S. Pat. No. 8,117,989, each of which are incorporated herein by reference in its entirety.

FIELD AND BACKGROUND OF THE INVENTION

This invention relates generally to dairy milker unit liners and more particularly to milker unit teat cup liners with internal flow diverters for distributing teat dip before a milker unit is detached from an animal being milked.

Milking machines are attached to dairy animals to withdraw and collect milk. The part of the milking machine that interfaces with the dairy animal includes an outer shell, called a teat cup, and an interior liner. A dairy animal's teat is inserted into a top opening in the teat cup and liner for milking. With vacuum hoses connected to these components, a pulsation is created that withdraws milk from the dairy animal's teat.

Liners are shaped and sized to maximize animal comfort, and to be efficient and responsive to the vacuum that causes pulsation. Liners have different designs, but all liners or liner assemblies have at least an upper dome and a barrel extending down from the dome. The liner components may be formed in a single unit or the dome and barrel may be separate pieces. The dome defines an opening through which a dairy animal's teat is inserted for milking. The dome also includes an outer skirt that fits down over the top of the teat cup to secure the two components together.

In addition to milking the animal, the vacuum also secures the teat cup and liner to the animal's teat during milking. When milking is completed, the vacuum is reduced so that the teat cup and liner are detached from the animal.

To maintain healthy animals and reduce the incidence of harmful mastitis, teats are treated with antimicrobial cleansers and sealants known as teat dips. These teat dips can be applied before milking or after milking depending on their primary purpose. Teat dips are usually applied by a dairy operator raising a hand-held cup full of teat dip into contact with the teat and possibly the lower udder or by spraying the teats with a hand-held wand.

To reduce manpower and improve animal throughput in a dairy, it is desirable to automate certain procedures normally performed by dairy operators. Applying a post-milking teat dip is one such operation that has been considered for automation.

Teat dip applicators incorporated into a milking machine apply dip to a cow's teat and possibly the lower portion of the udder just prior to detachment of the milking machine from the cow. Teat dip is injected with pumps or pushed with air pressure through nozzles or small orifices that are mounted on the corresponding teat cup or formed in the dome portion of the liner. (See for example: US 2006-0112886-A1.) Given size and time constraints, a single nozzle aimed at the teat applies teat dip to one side of the teat, but the opposite side is less likely to be covered unless a larger dosage of teat dip is injected.

Multiple nozzles have been proposed in an attempt to provide more uniform dip application than might be possible with a single nozzle. Multiple nozzles are fed by multiple tubes from a teat dip source or from a chamber formed in the liner dome. Given the confined nature of the liners within teat cup shells, tubes and chambers must be relatively small, and can be subject to clogging. Multiple nozzles also present increased manufacturing costs.

Another consideration in any such automated teat dip applicator is safety. Teat dips cannot be mixed with milk. Any system used to automatically apply a teat dip that is exposed to the inside of a milker unit liner also exposes the milk to a potential contaminant. As a result, the liner should be backflushed with water or cleansing solutions before the next animal is milked. Such backflushing is also most efficient and consistent if it is done automatically.

Thus, there is a need for an improved mode for delivering teat dip to upper portions of teats through automated dipping equipment.

SUMMARY OF THE INVENTION

The present invention overcomes problems associated with teat dip delivery through small or multiple orifices and nozzles formed in milking liner domes. The present invention provides more uniform delivery of teat dip to an upper portion of a teat and/or the lower portion of a cow udder while reducing the amount of teat dip applied, as well as the number of nozzles and orifices that might otherwise be required to obtain substantially uniform teat dip coverage. Further, the liner mouthpiece wipes the teat dip down the teat when the milker unit drops from the cow at the end of milking.

The present invention is a milker unit liner dome that includes internal flow diverters that simplify teat dip distribution and make liner cleaning easier and more thorough. Also, because liners are relatively inexpensive and are replaced regularly, the flow diverter geometry of the liner can be updated without undue expense.

The present invention simplifies distribution of teat dip with a liner dome design that requires no assembly and is relatively inexpensive to manufacture. Further, dips of various viscosities can be used with reduced clogging.

A milker unit liner in accordance with the present invention includes a dome having an opening through which a cow's teat extends during milking. When a teat is inserted, a dome chamber is essentially divided into an annular space. A liner dome in accordance with the present invention has joined to its inner surface a flow diverter such as a ramp, channel, vane, ridge, or other shape to direct flow of teat dip and/or cleaning fluid from an inlet to all portions of the teat including the side that is opposite the teat dip inlet. A flow diverter in accordance with the present invention improves the flow characteristics of dip through the dome as compared to a standard dome chamber.

The present invention may include an improved inlet or nozzle in the form of a slit in the liner and acts essentially as a one-way valve to prevent milk, cleaning fluid, or debris from flowing or being forced into the teat dip delivery hole. The slit can be molded into the dome or cut after the molding process used to manufacture the dome. The inlet may also be a simple hole with the supply tube blocked at times to prevent vacuum leakage or backflow of fluids. This hole or port can then be cleaned each time the dipping process takes place.

The flow diverters in accordance with the present invention can also be utilized to simplify teat dip delivery tubes that are connected to the liner and/or outer shell. For example, some delivery tubes require an elbow to redirect flow into a radial flow toward the teat. The present invention can include ramps for redirecting upward flow into a radially inward flow without the need for an elbow.

Other features and embodiments will become apparent in the detailed description below.

BRIEF DESCRIPTION OF THE DRAWINGS

FIG. 5 is a perspective view of a milker unit liner dome chamber in accordance with the present invention.

FIG. 6 is a perspective cross-sectional view of a liner in accordance with the present invention;

FIG. 7 is a side cross-sectional view of the inside of an alternate embodiment of a liner dome in accordance with the present invention;

FIG. 8 is a perspective view of the inside of an alternate embodiment of a liner dome in accordance with the present invention;

FIG. 9 is a perspective view of the inside of an alternate embodiment of a liner dome in accordance with the present invention; and FIG. 10 is a cross-sectional view of the inside top of a liner dome in accordance with the present invention.

DETAILED DESCRIPTION OF THE PREFERRED EMBODIMENTS

Figure 1:
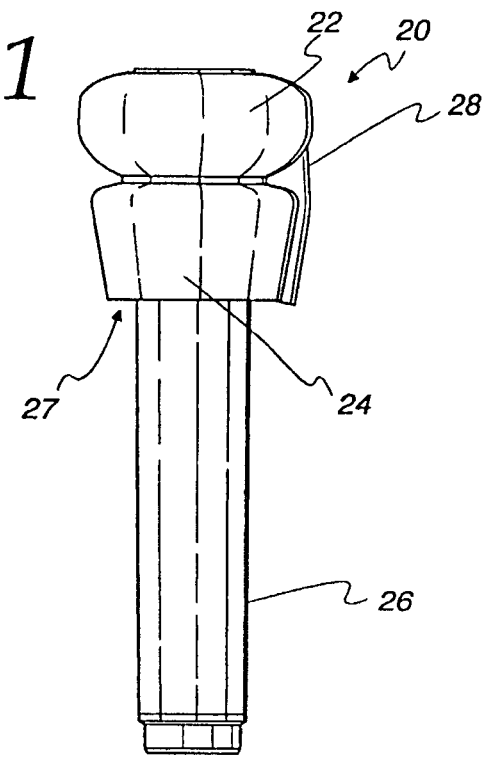
FIG. 1 is a side elevational view of a milker liner in accordance with the present invention.

In FIG. 1, there is depicted a milker unit liner 20 in accordance with the present invention. The liner 20 includes a dome 22, a skirt 24, a barrel 26, and a delivery channel 28. The skirt 24 extends downward from the dome 22 and is spaced away from the barrel 26 to define a recess 27.

The liner 20 is sized and shaped to fit into a conventional outer shell or "teat cup" (not illustrated) so that the top of the teat cup fits in the recess 27 between the skirt 24 and the barrel 26. This relationship secures the liner 20 to the teat cup and forms a seal for the vacuum. The liner barrel 26 may have any cross-sectional shape including round and square. Alternatively, a liner can comprise a separate dome and barrel that are connected to each other directly or indirectly using a teat cup or the other suitable device. The present invention is directed to a dome 22 having an inner surface to which flow diverters are joined regardless of the type, size, or shape of barrel. The liner 20 can be made of rubber, silicone, or other suitable materials.

The delivery channel 28 can be formed integrally with the other liner components or attached after the liner 20 is formed. The delivery channel 28 may also be a separate component so long as it is attached to the liner 20 to act as a conduit for teat dip or cleaning fluids being introduced into the dome 300.

Figure 2:
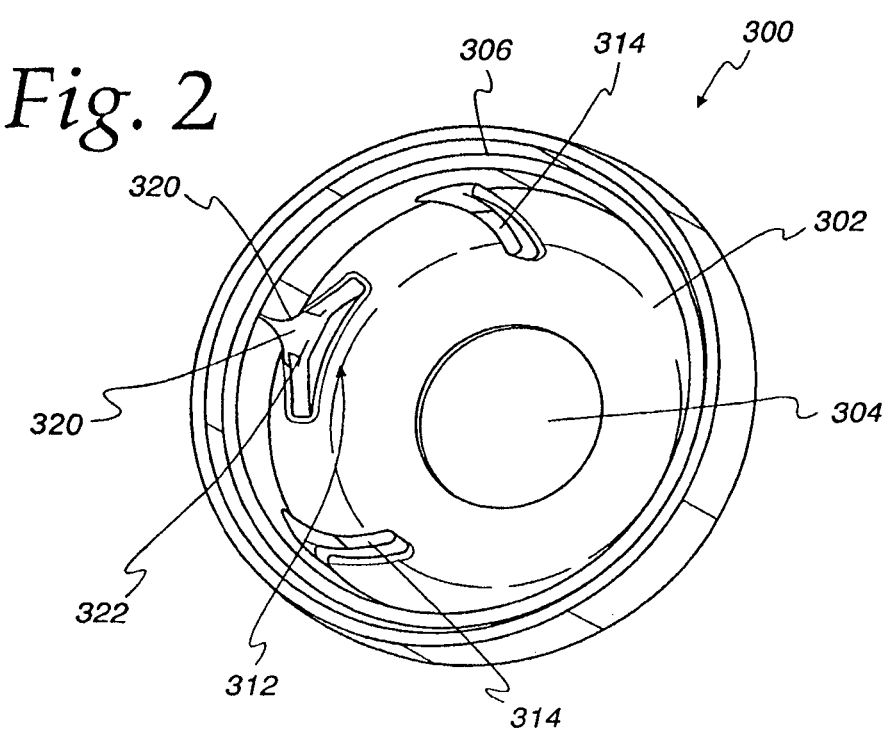
FIG. 2 is a perspective view of a milker liner dome chamber in accordance with the present invention.

FIG. 2 illustrates an embodiment of a liner dome 300 in accordance with the present invention, and that is removed from the other liner components and inverted to show an inner surface 302. This dome 300 includes a teat opening 304, and an annular recess 306 for mating with the top of a teat cup (not illustrated).

The liner dome 300 further includes a teat dip distribution structure having an inlet 366 (see FIG. 3), a first flow diverter which is illustrated in this embodiment as a flow bifurcating vane 312, and a second flow diverter which is illustrated as a pair of ridges 314. The inlet 366 is preferably an opening that is the same diameter as the delivery channel 28, but it can be any size or shape to obtain satisfactory flow characteristics or simply provide ease of manufacturing. The inlet 366 could also include a nozzle in the form of a slit, for example, that is either molded into the dome 300 during manufacture or cut into the dome 300 after molding. A slit shape acts as a one-way valve to inhibit the flow of milk, teat dip 367 (FIG. 3), cleaning fluid, and debris from flowing in the wrong direction through the inlet 366.

The inlet 366 can also be a simple opening in the dome 300, and a delivery tube may be used in combination with the inlet 366 so that the delivery tube defines the flow characteristics or a valve and the inlet 366 simply provides an opening through which teat dip passes into the dome 300. Regardless of its shape or size, the inlet 366 is preferably joined to the dome 22 by being formed integrally in the liner dome 22, but the inlet 366 can be joined to the dome 22 in any other suitable manner.

The inlet 366 is connected via the delivery channel 28 to a teat dip source and/or a backflushing source (not illustrated). In this manner, teat dip 367 (FIG. 3) is provided through the inlet 366 under pressure from a pump, air pressure or other suitable device. It is preferred that the teat dip supply device include a mechanical feed system, such as a piston, for example, but pneumatic delivery can also be used. The mechanical feed system is preferred because it minimizes foaming of teat dip solution in the supply lines that can occur when pressurized air is used. Nonetheless, foaming teat dips can also be used with the present invention. A mechanical feed also enables the use of a teat dip dosage device that applies a predetermined amount of dip. It is preferred to use a single inlet 366, but multiple inlets could be used.

When entering dome 300 of this embodiment, teat dip flows generally upward in a direction approximately parallel to the longitudinal axis of the liner. Teat dip then flows along a flow path defined by a direction that the inlet is aimed, but which is generally and preferably toward the dome 300. In other embodiments, the flow path can be oriented in a generally radially inward direction or in a tangential direction, but with the flow diverters of the present invention, any inlet orientation can be used so long as the inlet directs fluid substantially toward at least one of the flow diverters.

If left to flow directly toward a teat, most of the dip would be applied to the side of the teat closest to the inlet 366, with some flow possibly reaching other sides of the teat if the dosage quantity is high enough. It is unlikely in practice that dip would reach all teat sides and even less likely that teat dip application would be uniform as preferred.

To redirect the inward and radial flow, the flow bifurcating vane 312 is disposed adjacent to the inlet 366 and in a flow path defined by the inlet 366. The flow bifurcating vane 312 is shaped to split and redirect the upward flow from the inlet 366 into a substantially annular flow path or pattern around the periphery of the dome inner surface 302. As depicted, the flow bifurcating vane 312 splits the flow substantially evenly in each direction to define a pair of flow paths, but if other inlets are used or other conditions warrant, the flow could be split in other proportions or simply redirected in a desired flow path.

The inlet 366 preferably defines two ramped and arcuate surfaces 320 on which the teat dip flows as it is being redirected. In this embodiment, a raised central portion 322 is used to confine the flow so that teat dip is not flowing directly toward the teat. In alternate embodiments, it is possible to permit some of the flow to be applied directly to the teat without being substantially redirected. In such embodiments, the central portion 322 may include openings, slots or ramps through or over which teat dip can flow. It is even permissible for some of the dip to flow over the bifurcating vane 312 and directly toward the teat. Further, the arcuate surfaces 320 can be shaped so that teat dip flow is not directed around the periphery, but instead through a flow pattern or radius that is smaller than the dome chamber's 302 periphery.

The flow ridges 314 preferably have arcuate shapes and contact surfaces that are joined to the inner surface 302 of the dome 300 and arranged in the flow path. The flow ridges 314 are shaped and sized to redirect the peripheral teat dip flow inward toward a cow's teat. In a preferred embodiment, the flow ridges 314 have a height dimension that redirects all the teat dip flowing from the flow bifurcating vane 312. In alternate embodiments, the height of the flow ridges 314 could be reduced to permit some of the flow to by-pass the flow ridges 314 and flow to the part of the inner surface 302 opposite the flow bifurcating vane 312 or to other flow diverters (as described below). Further, the flow ridges 314 are depicted as being symmetrical, but they could be different sizes, shapes, positions, or orientations to provide asymmetric flow, if desired.

Most types of teat dip that would be flowing through the dome 300 have an inherent surface tension that helps establish a desired flow characteristic by remaining adjacent to the dome 300 surface and to the cow's teat so that the dip will cover areas of the teat that are not in the direct flow path defined by the flow diverters.

The flow diverters of the present invention are joined to the inner surface of the dome by being molded integrally with the dome, or they may be joined to the inner surface of the dome with glue or any other suitable means.

Figure 3:
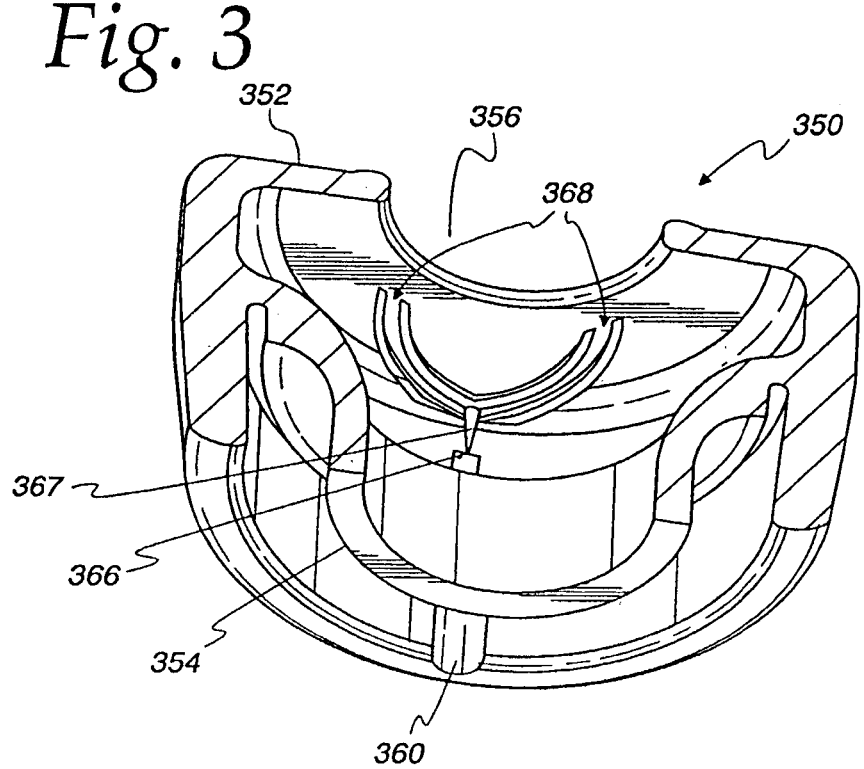
FIG. 3 is a partial perspective cross-sectional view of a milker unit liner in accordance with the present invention.

FIG. 3 is an alternate embodiment of the present invention illustrating a cross-section of an upper portion of a liner 350 having a dome 352, a barrel 354, and a teat opening 356. A delivery channel 360 is formed integrally with the dome 352. A hose, pipe, or tube (not illustrated) can be joined to the delivery channel 360 as a conduit between a source of teat dip and the delivery tube 360, as described above.

The delivery channel 360 has at its upper end an inlet 366 that may be the same diameter of the delivery channel 360 or in the form of a nozzle or slit that is either molded into the liner 350 or cut after the liner 350 is molded. A slit inlet 366 is biased toward a closed position and will close when no pressurized teat dip is flowing up through the delivery channel 360, yet it is flexible enough to permit passage of teat dip when it is fed through the delivery channel 360. As such, the inlet 366 performs as a one-way valve in the way of a more intricately formed "duck-billed" valve. Other inlet shapes and styles can be used in all the embodiments of the present invention, including openings of the same or larger diameter of the delivery channel 360.

The inlet 366 feeds a first flow diverter that in this embodiment is a pair of diverging channels 368 adjacent to the inlet 366 that redirect the flow of teat dip around the teat opening 356. The channels 368 are formed in a preferred shape as illustrated, but other shapes and orientations are possible within the scope of this invention. Indeed, the particular number of channels 368, their shape, orientation, and depth can vary depending upon teat dip viscosity, flow velocity, and flow volume, for example.

The channels 368 being open also aid in backflushing and cleaning of the milk liner 350 periodically or prior to another cow being milked. Nonetheless, closed flow diverters can be used in the present invention. In addition, other flow diverters can be used in combination with the channels 368 to provide substantially uniform distribution of teat dip.

Figure 4:
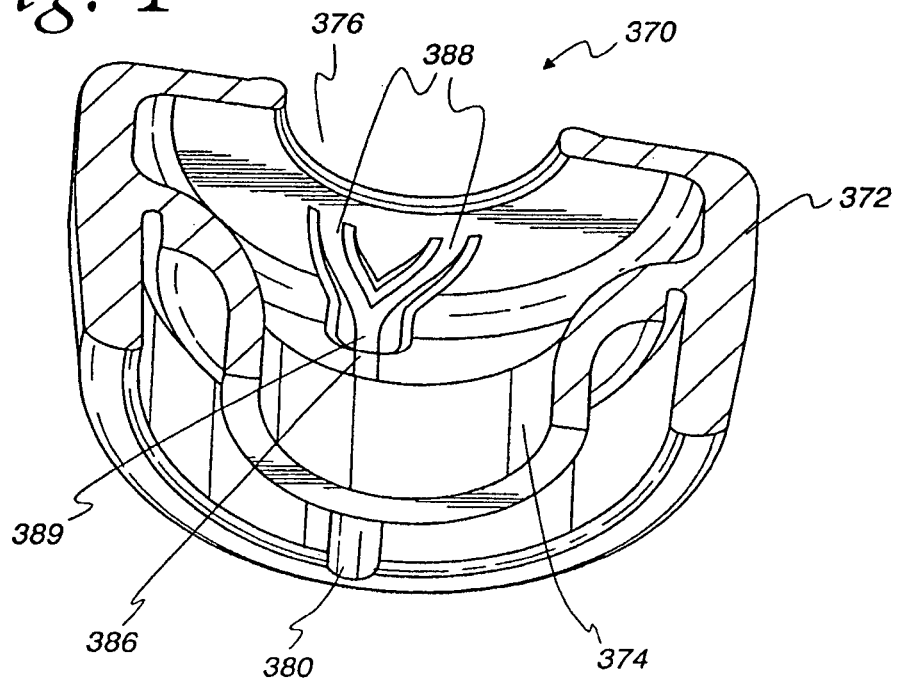
FIG. 4 is a partial perspective cross-sectional view of a liner for a milker unit in accordance with the present invention.

FIG. 4 is another embodiment of a liner 370 having a dome 372, a barrel 374, a teat opening 376, a delivery channel 380, an inlet 386, and a flow diverter in the form of channels 388. The primary difference between this and the FIG. 3 embodiment is the shape, depth, and orientation of the channels 388, which in this embodiment provide a different teat dip flow pattern. The channels 388 are fed by a first channel 389 to form an essentially y-shaped combination of channels. Again, the inlet 386 in this and all other embodiments of the present invention, provides an opening into the dome 372 and need not affect the flow characteristics or direction of teat dip.

FIGS. 5 and 6 illustrate yet another liner dome 500 embodiment in accordance with the present invention having an inner surface 502, a radially inwardly directed inlet 504 fed by a delivery channel 505, a teat opening 506, a plurality of flow diverters that are, in this embodiment, ridges 510, and a flow diverter that is a flow bifurcator 512 adjacent to the inlet 504. Each ridge 510 is spaced apart from the inlet 504 and from each other to form a flow path that is substantially helical in shape and originates from the inlet 504 and terminates around the teat opening 506. Teat dip flows upward and through a bend or elbow in the delivery channel 505 to the radially directed inlet 504, toward the flow bifurcator 512, and against the ridges 510 to establish substantially uniformly coat a teat.

The ridges 510 can be of other shapes and heights to ensure uniform teat dip coverage for a given teat dip viscosity, for example. In addition, the ridges 510 are segmented or shorter than a complete helix so that the liner domes and openings are more flexible and conforming to a teat.

The flow bifurcator 512 includes a central divider 514 and two ridges 516 that are spaced apart from the central divider 514. The inside surface 502 of the dome 500 is concave and the flow diverters 510 and flow bifurcator 512 may extend at different angles depending upon their respective radial positions inside the dome surface 502.

FIG. 7 illustrates a liner 551 and shell 561 assembly, with the liner including a barrel 528 and an alternate embodiment of a dome 550 having an inner surface 552, a delivery channel 555, an upwardly directed inlet 554, and a plurality of flow diverters in the form of a flow bifurcator 564 and a number of ridges 560. The flow path in this embodiment is upward from the delivery channel 555, through the inlet 554, and into the dome 550. Once in the dome 550, the flow is diverted by the flow bifurcator 564 and against the ridges 560. The flow continues through the dome 550 and around the teat opening 506, for more uniform coverage of an animal teat disposed in the liner.

This embodiment is somewhat easier to manufacture because the delivery channel 555 and inlet 554 are both directed upwardly. No elbows or bends are necessary in the delivery tube 555 because the flow is directed upwardly in a longitudinal flow path parallel to the liner barrel and onto a flow diverter 564 that is shaped to redirect the flow radially inwardly toward the ridges 510. Alternatively, as stated above, the inlet 554 can be directed radially inwardly or tangentially. Again, any size or orientation of an inlet can be used so long as it provides an opening for teat dip.

When the delivery channel 555 is disposed inside the shell it is desirable to position the delivery channel 555 where it will be spaced apart from the barrel 528. This is so that the liner 551 does not contact the inside of a shell, or inner delivery channel. Doing so could cause premature liner failure. The liner barrel 528 illustrated in FIG. 7 is triangular shaped when viewed in cross-section from the top. Other shapes such as round or square can also be used. A triangular or square barrel should be located in the shell so that it will not have contact with the delivery channel. This can also be achieved with round liners by sizing the diameter of the liner to not contact the delivery channel or by slightly modifying the barrel geometry, either with small ribs or with slight variances in wall thickness, forcing the liner to collapse in a defined plane.

Such an arrangement can also be seen in the alternative dome 600 of FIG. 8. This dome 600 has an inner surface 602, a teat opening 606, a plurality of flow diverters in the form of ridges 612, and a flow diverter in the form of a flow bifurcator 614 adjacent to the inlet (inlet not illustrated). The flow bifurcator 614 includes a ramp 620 and a pair of ridges 616. The ramp 620 redirects the upward flow from an inlet (not visible in this figure) and inwardly toward the ridges 612. The ridges 616 cooperate with the ramp 620 to confine the flow and direct it toward the inside of the ridges 612.

In this embodiment, the flow into the dome 600 begins from an inlet that is directed generally upward and parallel to a longitudinal axis of the liner ("longitudinal direction"). The delivery channel can be formed integrally with the barrel of the liner or be a separate device connected to the liner.

FIG. 9 illustrates another alternate dome 700 having an inner surface 702, a teat opening 706, a plurality of flow diverters in the form of ridges 712, and another flow diverter in the form of an ramped flow controller 714 adjacent to an inlet (not illustrated) that is directed longitudinally relative to the liner barrel and toward the inner surface 702 of the dome 700, as described above. This embodiment uses fewer, but longer ridges 712 than were described above in relation to the FIGS. 5 to 9 embodiments. This embodiment also uses an inlet flow controller 714 having a pair of flared ridges 716, a ramp 718, and a flow bifurcator 720 that direct incoming teat dip toward the teat opening 706, but with a flow component that is slightly radially outward toward the flow diverters 712.

The embodiments of FIGS. 5 through 8 that use relatively short ridges, as opposed to a continuous ridge, have the benefit of having less of an influence on the shape and flexibility of the dome. Large ridges tend to stiffen the dome, while shorter ridges allow the dome to remain more flexible, which can be desirable. In addition, cleaning smaller flow ridges is easier and they create a smaller "shadow" area in which cleaning fluid might not reach. Smaller flow ridges also drain easier and retain less dip and cleaning liquids, so they are less likely to contaminate milk of the next animal to be milked.

Yet another embodiment of a dome 800 in accordance with the present invention is illustrated in FIG. 10. This embodiment includes an inner surface 802, a teat opening 806, and a plurality of flow diverters in the form of a bifurcator 810, a pair of channels 811, and ridges 812. The inlet 813 is an upwardly directed inlet similar to the one illustrated in FIG. 7. The bifurcator 810 is shaped to redirect the upwardly directed ("longitudinal") flow toward the channels 811 and along the outer edge of the dome 800 and toward the ridges 812. The ridges 812 redirect the flow inwardly toward the teat opening 806.

In the preferred embodiments, teat dip is distributed around a teat as evenly as possible. To do so, most of the dip should be directed tangentially around the teat. Nonetheless, some of the dip may be allowed to flow over the flow bifurcators or directly to a teat so that approximately one-third of the flow reaches the teat directly. The remaining teat dip (approximately two-thirds of the total amount) is directed with the various flow diverters to reach the teat sides positioned away from the inlet. The teat dip flowing tangentially to a teat adheres to the teat surface and flows for nearly uniform coverage due to surface tension and fluid momentum.

When utilizing the present invention, it is desired that the milker unit remain attached to a teat for a slightly longer period than normal to ensure that teat dip is properly applied after milking has ended. This time period is relatively brief, but it is desired that a pulsator unit that is used to apply the vacuum for milking cows also be utilized to keep the milker unit attached while the teat dip is being applied.

To do so, the pulsator is actuated to collapse the liner barrel around the teat while dip is applied through the dome and flow diverters described above. Collapsing the liner barrel also benefits teat dip application and coverage because the teat dip tends to pool around the teat and then be wiped down the length of the teat as the liner and milker unit are detached from the cow. Thus, the present invention improves teat dip coverage on all sides of the teat, as well as, along the length of the teat.

Also, by synchronizing teat dip application and milker unit detachment, the milker unit can be supported as it drops from a cow, and is less likely to strike the deck on which the cows stand when being milked.

The foregoing detailed description of the invention is provided for clearness of understanding only and no undue limitations therefrom should be read into the following claims.

The invention claimed is:

1. A method for applying a fluid to a dairy animal teat at the end of milking and before detachment of a milker unit, the method comprising the steps of:
   directing the fluid through an inlet in a milker unit teat cup liner in which the dairy animal teat is disposed; and
   redirecting the fluid with a flow diverter on an upper inner surface of a dome in the milker unit teat cup liner, and the flow diverter includes a ridge extending generally downwardly and away from the upper inner surface of the dome to define an open flow path while the milker unit teat cup liner is generally upright and attached to the dairy animal teat.

2. The method of claim 1, wherein the step of directing the fluid through an inlet in a milker unit teat cup liner comprises the step of:
   directing the fluid toward the upper inner surface of the liner dome.

3. The method of claim 1, wherein the step of directing the fluid through an inlet in a milker unit teat cup liner comprises the step of:
   directing the fluid through a one-way valve.

4. The method of claim 1, wherein the step of directing the fluid through an inlet in a milker unit teat cup liner comprises the step of:
   directing the flow through the inlet at a position adjacent to the upper inner surface of the dome.

5. The method of claim 1, wherein the step of redirecting the fluid with a flow diverter comprises the step of:
   redirecting the fluid into an arcuate flow path.

6. The method of claim 1, wherein the step of redirecting the fluid with a flow diverter comprises the step of:
   bifurcating flow of the fluid.

7. The method of claim 1, wherein the step of redirecting the fluid with a flow diverter comprises the step of:
   bifurcating flow of the fluid with a flow diverter disposed adjacent to the inlet.

8. The method of claim 1, wherein the step of redirecting the fluid with a flow diverter comprises the step of:
   redirecting the fluid in a substantially radial flow path.

9. The method of claim 1, and further comprising the step of:
   redirecting the fluid with a second flow diverter on the upper inner surface of the dome in the milker unit teat cup liner, and the second flow diverter extends away from the upper inner surface of the dome.

10. The method of claim 1, wherein the step of directing the fluid through an inlet in the milker unit teat cup liner comprises the step of:
    directing the fluid toward the upper inner surface of the dome, and the inlet is disposed adjacent to the upper inner surface of the dome; and
    wherein the step of redirecting the fluid with a flow diverter comprises the step of:
    redirecting the fluid into an arcuate flow path.

\* \* \* \* \*